United States Patent [19]

Quigley, Jr.

[11] 4,120,151

[45] Oct. 17, 1978

[54] SOLID PROPELLANT PRESSURIZATION OF MONOPROPELLANT FUEL POWERED SYSTEM

[75] Inventor: Richard E. Quigley, Jr., Kettering, Ohio

[73] Assignee: The United States of America as represented by the Secretary of the Air Force, Washington, D.C.

[21] Appl. No.: 790,773

[22] Filed: Apr. 25, 1977

[51] Int. Cl.$^2$ .............................................. F02C 1/04
[52] U.S. Cl. ............................... 60/39.46 M; 60/39.48
[58] Field of Search .............. 60/39.46 M, 39.48, 259, 60/257, 200 R

[56] References Cited

U.S. PATENT DOCUMENTS

| | | | |
|---|---|---|---|
| 3,013,388 | 12/1961 | Loughran | 60/39.48 |
| 3,029,598 | 4/1962 | Saltarelli et al. | 60/259 |
| 3,494,513 | 2/1970 | Bauer | 60/39.48 |
| 3,842,598 | 10/1974 | Forsten | 60/39.46 M |

OTHER PUBLICATIONS

Salzman, J.; "Solids Give Liquids a Boost", *Astronautics*, Oct. 1958, pp. 30-31, 78.

*Primary Examiner*—Robert E. Garrett
*Attorney, Agent, or Firm*—Joseph E. Rusz; Richard J. Killoren

[57] ABSTRACT

A pressurization system for a positive explosion tank in a monopropellant fuel powered system having a solid propellant device used to provide the gas pressure in the positive expulsion tank. A relief valve is provided between the solid propellant device and the positive expulsion tank to prevent over pressurization of the tank. A deflector shield is provided in the inlet of the positive expulsion tank to protect the tank bladder from direct impingement of the hot gases from the solid propellant device. With sodium azide used as the solid propellant, a device is provided in the positive expulsion tank to permit self flushing of the monopropellant catalyst pack.

1 Claim, 4 Drawing Figures

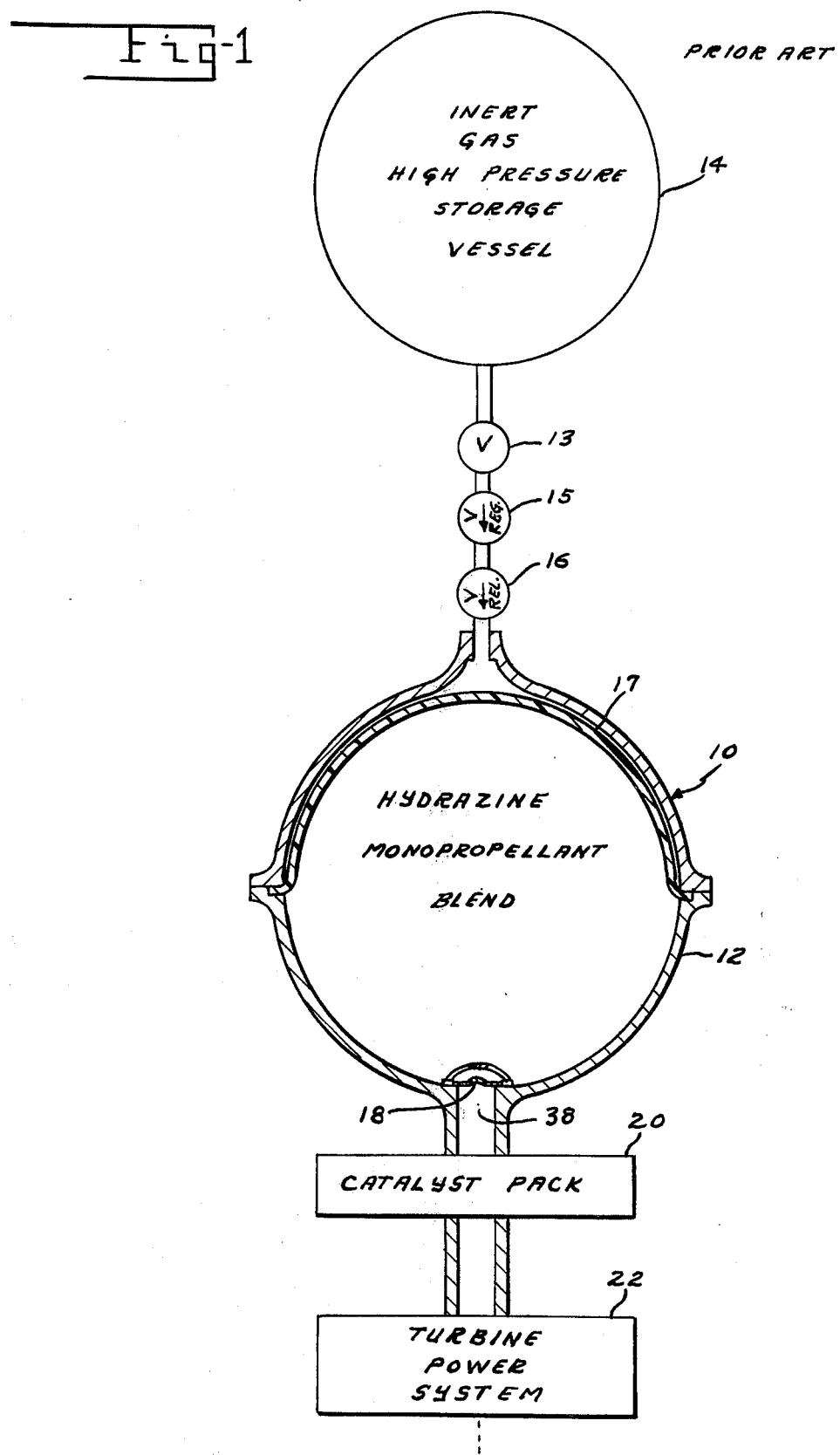

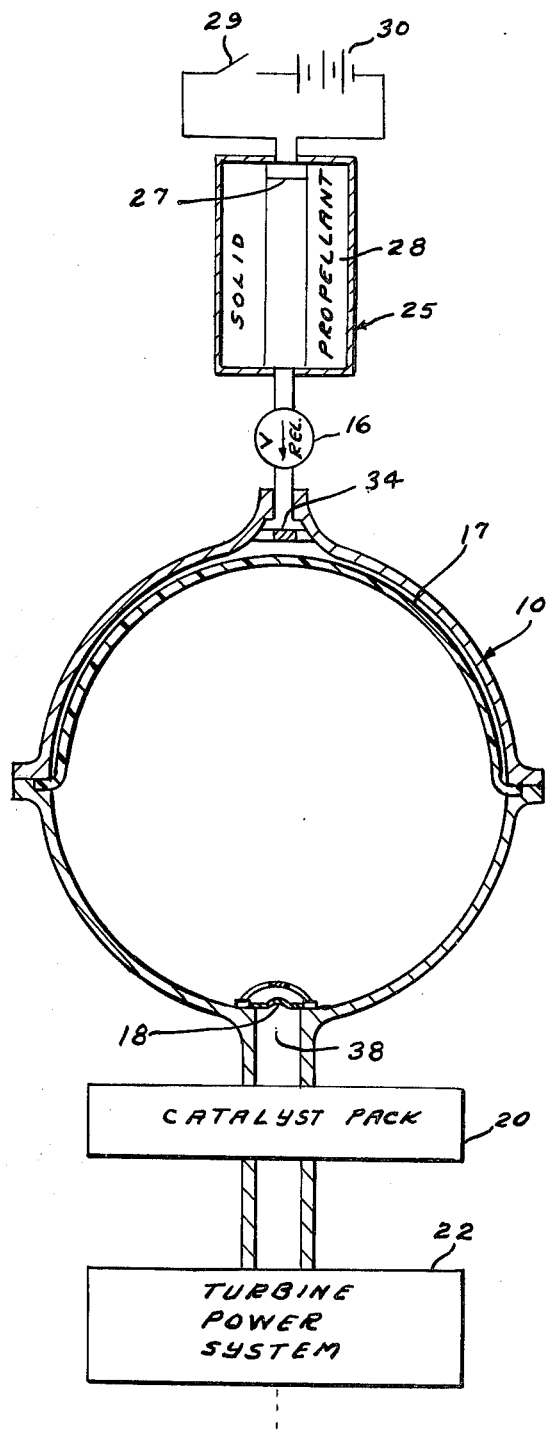

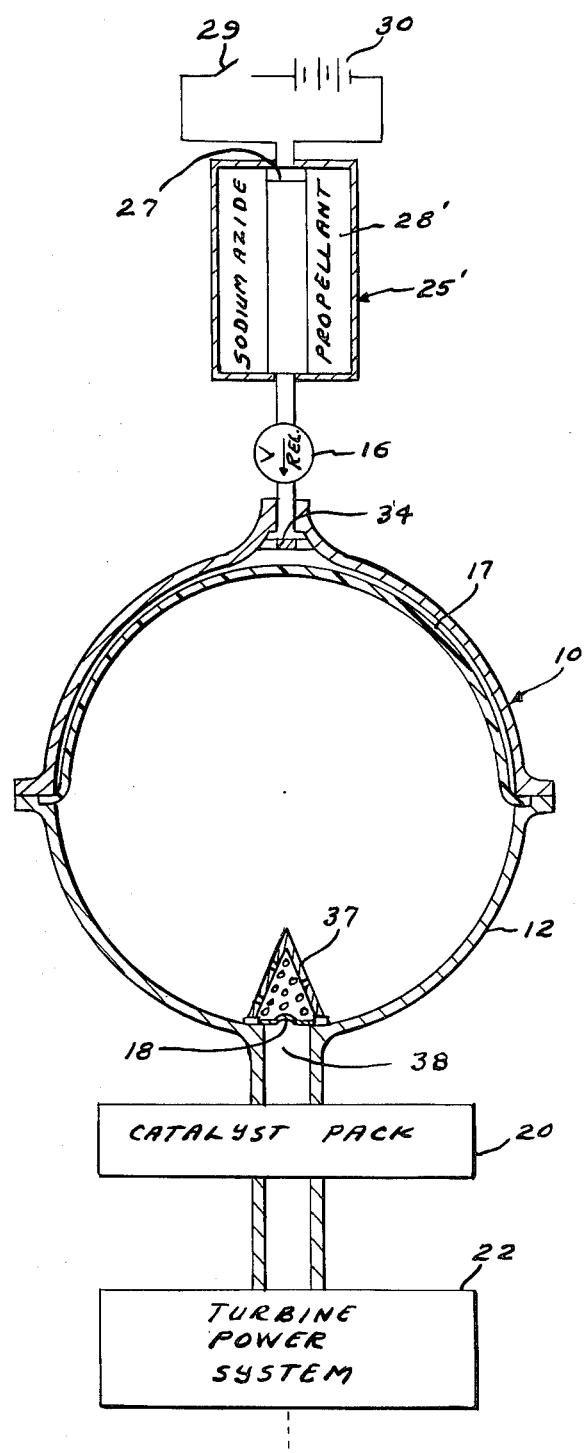

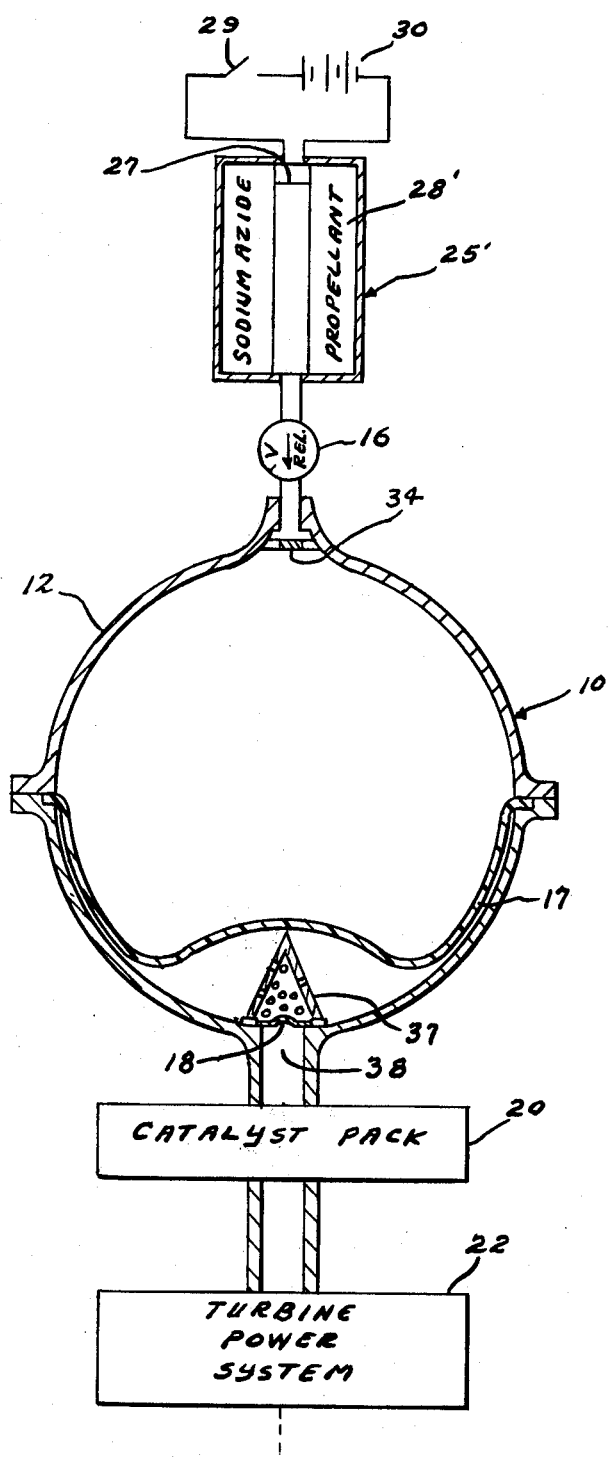

SOLID PROPELLANT PRESSURIZATION OF MONOPROPELLANT FUEL POWERED SYSTEM

RIGHTS OF THE GOVERNMENT

The invention described herein may be manufactured and used by or for the Government of the United States for all governmental purposes without the payment of any royalty.

BACKGROUND OF THE INVENTION

This invention relates to a pressurization apparatus for a positive expulsion tank for a monopropellant fuel powered system.

Positive expulsion tanks have been used in systems for supplying propellant components to rocket engines. Stored gas or evaporable liquids have been used to provide the pressurization gas for the positive expulsion tank. These systems require bulky storage containers or complicated high cost pressurization apparatus.

Positive expulsion tanks have been used in auxiliary power units, such as starters for aircraft. In these devices, positive expulsion tanks have been used to supply a monopropellant to a catalyst pack wherein the monopropellant is decomposed to supply a driving gas for the starter turbine. After the operation of the auxiliary power unit is completed, the catalyst pack is flushed with nitrogen gas to purge any monopropellant products which might poison the catalyst pack. This provides a longer life for the catalyst pack.

BRIEF SUMMARY OF THE INVENTION

According to this invention, the pressurization gas for the positive expulsion tank used in the auxiliary power unit is provided by using the exhaust products of a solid propellant. The exhaust products from the solid propellant are supplied to the positive expulsion tank. A deflector is provided at the inlet of the positive expulsion tank to keep the high temperature gases from the solid propellant system from impinging directly on the bladder in the positive expulsion tank. With sodium azide used as the solid propellant, self purging of the catalyst pack is provided.

IN THE DRAWINGS

FIG. 1 shows a prior art system for supplying driving gases for a starter turbine.

FIG. 2 shows the device of FIG. 1 modified according to one embodiment of the invention.

FIG. 3 shows a modification of the device of FIG. 2.

FIG. 4 shows the device of FIG. 3 immediately prior to the catalyst pack purge phase.

DETAILED DESCRIPTION OF THE INVENTION

Reference is now made to FIG. 1 of the drawing which shows an auxiliary power unit 10, such as a starter drive package, having a positive expulsion tank 12 containing a blend of hydrazine monopropellant which may be one of those shown in the chart below.

| | Composition % by Weight | |
|---|---|---|
| $N_2H_4$ | $N_2H_5NO_3$ | $H_2O$ |
| 60 | 21 | 19 |
| 58 | 25 | 17 |
| 68 | — | 32 |

When valve 13 is opened an inert gas, supplied from pressure vessel 14, passes through regulator valve 15 and relief valve 16 to the tank 12 and acts against bladder 17 to force the monopropellant from the tank 12. When the pressure is increased in in the tank 12, the burst disc 18 is ruptured to permit the monopropellant to pass through the catalyst pack 20. The catalyst in pack 20 may be shell 405 catalyst containing $Al_2O_3$ and iridium, which is currently used in all major space programs. However, any catalyst which is spontaneous at ambient temperature could be used.

The monopropellant is decomposed in the catalyst pack 20 to supply the driving gas for the starter turbine 22.

The device of FIG. 1 is modified according to this invention, as shown in FIG. 2. In the device of FIG. 2, the high pressure vessel 14 is replaced with a solid propellant device 25 having a solid propellant 28 and a starting igniter 27 which is energized by closing switch 29 to the power supply 30. In this device, only the pressure relief valve 16 is used to prevent over pressurization of expulsion tank 12. The other valves in FIG. 1 are not needed. A deflector 34 is provided in the inlet to tank 12 to keep high temperature gases from impinging on bladder 17. However, the bladder 17 would be made of a material, such as polyethylene, to make it resistant to the high temperature gases.

When switch 29 is closed, the solid propellant is started by igniter 27 and supplies the propellant products to tank 12. When the pressure in tank 12 reaches a predetermined level, the burst disc 18 ruptures and the device operates in the manner described above.

After each operation, the catalyst pack 20 is flushed, in a conventional manner, with an inert gas to purge the catalyst of any products of decomposition to prevent poisoning of the catalyst and give it a longer life.

The device can be modified, as shown in FIG. 3, to provide a self flushing of the catalyst pack. In this device, the solid propellant 28' used is sodium azide. Since only nitrogen gas is given off in a sodium azide propellant with the other products of combustion forming a clinker which remains within the propellant pack, the nitrogen can be used to flush the catalyst pack in the manner shown in FIGS. 3 and 4. In this device, a pointed projection 37 is provided at the lower end of tank 12 adjacent the exit 38. When bladder 17 contacts the projection 37, as shown in FIG. 4, after substantially all of the propellant has been removed from tank 12, the bladder 17 is ruptured to admit the nitrogen gas to the catalyst pack 20 to flush the catalyst pack, and thus prevent poisoning of the catalyst pack. The device as shown in FIGS. 3 and 4 is only intended for illustration purposes. In an actual device, the amount of propellant remaining in tank 12 at the time that the bladder 17 is ruptured would be very small and this would be flushed through the catalyst pack with the first flow of nitrogen gas.

There is thus provided a positive expulsion monopropellant fuel powered system, using a catalyst wherein bulky storage containers and high cost pressurization systems are not required and wherein a self flushing of the catalyst pack is provided.

I claim:

1. In an auxiliary power unit having a turbine adapted to supply power to a load, an expulsion tank including a movable flexible bladder, secured to the wall of said tank; a monopropellant within said tank on one side of said bladder; an outlet in said tank on the side of said bladder adjacent said monopropellant; means, within said outlet, for retaining the monopropellant within said tank until the pressure in said tank reaches a predetermined level; a catalyst pack connected between said tank outlet and said turbine; said catalyst pack including means for decomposing the monopropellant to provide a turbine drive gas; apparatus for pressurizing said positive expulsion tank; comprising: a solid propellant cartridge including a sodium azide solid propellant; means for connecting said solid propellant cartridge to said positive expulsion tank on the side of said bladder remote from said monopropellant; a pressure regulation valve connected between said solid propellant cartridge and said positive expulsion tank; means, in said positive expulsion tank, for preventing direct impingement of gas from the solid propellant cartridge onto said bladder; means adjacent the outlet of said positive expulsion tank for puncturing the flexible bladder to admit the positive expulsion tank pressurizing gas to the catalyst pack to flush monopropellant products from the catalyst pack.

* * * * *